United States Patent
Hirakawa et al.

[11] Patent Number: 5,208,122
[45] Date of Patent: May 4, 1993

[54] ENCLOSED ALKALINE STORAGE CELL

[75] Inventors: Akira Hirakawa; Takahisa Awajitani; Hironori Honda, all of Sumoto, Japan

[73] Assignee: Sanyo Electric Co., Ltd., Osaka, Japan

[21] Appl. No.: 856,743

[22] Filed: Mar. 24, 1992

[30] Foreign Application Priority Data

Mar. 26, 1991 [JP] Japan .................................. 3-61881
Apr. 5, 1991 [JP] Japan .................................. 3-73113
Apr. 5, 1991 [JP] Japan .................................. 3-73114

[51] Int. Cl.$^5$ .......................................... H01M 4/90
[52] U.S. Cl. ................................. 429/222; 429/212; 429/215; 429/217; 429/218; 429/137
[58] Field of Search ............... 429/222, 215, 212, 218, 429/217, 137

[56] References Cited

U.S. PATENT DOCUMENTS 3,440,099  4/1969  Okinaka ................................. 136/6
4,938,780  7/1990  Kaiya et al. ......................... 429/222

FOREIGN PATENT DOCUMENTS 56-32744  7/1981  Japan .
63-965    1/1988  Japan .
63-13269  1/1988  Japan .
63-13270  1/1988  Japan .
63-13271  1/1988  Japan .
63-13272  1/1988  Japan .
2-90461   3/1990  Japan .

OTHER PUBLICATIONS

The Effect of Boric Acid Additions on Cadmium Electrode Migration in Potassium Hydroxide Electrolytes. R. E. Dueker and D. H. Fritts. J. Electrochem. Soc. Electrochemical Science and Technology, Jul. 1986.

Primary Examiner—Olik Chaudhuri
Assistant Examiner—M. Nuzzolillo
Attorney, Agent, or Firm—Armstrong, Westerman, Hattori, McLeland & Naughton

[57] ABSTRACT

The present invention discloses an enclosed alkaline storage cell. The enclosed alkaline storage cell comprising a negative electrode made of materials including a main active material of cadmium oxide, a positive electrode, and a separator impregnated with an alkaline electrolytic solution and interposed therebetween, characterized in that the negative electrode has a product produced by cross linking reaction between high polymers having hydroxyl group and at least one of boric acid and boric acid salt inside and/or on the surface thereof.

5 Claims, 7 Drawing Sheets

ENCLOSED ALKALINE STORAGE CELL

BACKGROUND OF THE INVENTION (1) Field of the Invention

The present invention relates to an enclosed alkaline storage cell, more particularly, to a non-sintered cadmium plate.

(2) Description of the Prior Art

A lead storage cell and a nickel-cadmium storage cell are conventionally utilized as a secondary cell. Generally, the nickel-cadmium storage cell is widely utilized in the fields covering from compact appliances to a space development because of its superior characteristics such as better discharge characteristics in a high current and a longer charge/discharge cycle compared with those of the lead storage cell. With the improvement in the performance of devices in these fields, longer reliability has been required for the nickel-cadmium storage cell.

The following are assumed to be the causes of how the nickel-cadmium storage cell comes to the end of its life.

(Cause 1) Dryout, that is, the internal electrolytic solution of the cell is released to the exterior thereof by means of a safe valve when the internal pressure becomes higher due to gas generation caused by overcharge.

(Cause 2) An internal shortcircuit with the progress of migration, that is, cadmium accumulates and fills up micro-holes of a separator through re-precipitation by a repetition of dissolution-precipitation reaction of the materials of the negative electrode in the course of charge and discharge.

The end of the cell life by dryout is caused by generation of inconsumable hydrogen gas from the negative electrode within the cell, which happens in the following conditions;

when the cell is overcharged, or when the chargeable capacity of the negative electrode becomes smaller than that of the positive electrode during charge/discharge cycles, which results in that the negative electrode fully charged faster than the positive electrode when the cell is charged.

However, such a phenomenon hardly happens under the normal usage as it can be prevented by providing a larger chargeable capacity appropriately to the negative electrode.

Consequently, a shortcircuit is assumed to be the major cause for deteriorating charge/discharge cycles. Although a cell having a paste negative electrode has become popular with its facility in obtaining a high energy density and lower operation cost, migration is observed conspicuously therein compared with a cell having a conventional sintered negative electrode. This is caused by an organic material as a binder included in the paste for the negative electrode in order to bind an active material together, which is not included in a cell having the sintered negative electrode because an active material is included in its matrix of sintered metal therein. More specifically, migration happens because the binder is oxidized or dissolves in the course of a repetition of charge/discharge cycles and comes to not to function as the binder for fixing the active material inside of the plate. Particularly, migration is accelerated when a bulk density of the active material is heightened in order to produce a cell with a larger capacity. Because when the cell is charged and discharged, the higher the bulk density becomes, the more the volume of the active material is fluctuated.

The following are methods proposed in order to prevent the short circuit caused by migration.

1) A method for thickening the separator or making micro-holes thereof smaller.

2) The method for adding quaternary ammonium to an electrolytic solution as disclosed in Japanese Laid-Open Patent Application No. 50-91728.

3) The method for adding alkali metal salt of silicic acid to the electrolytic solution as disclosed in Japanese Laid-Open Patent Application No. 56-32744, wherein a sintered negative electrode is utilized.

4) The method for dissolving a negative electrode with a nickel solution in order to form microporous nickel layers on the surface thereof and, further, adding a magnesium compound thereto as disclosed in Japanese Laid-Open Patent Application No. 2-90461.

However problems as follows still remain even with these methods.

The first method has a problem that the thicker the separator becomes, the larger area it requires inside the cell, which results in allocating smaller area for the electrodes. Therefore, an energy density of a cell is deteriorated as the total amount of the active material is decreased in response to the smaller area for the electrodes. Moreover, as the maximum thickness of the separator is not very great in a cell for practical usage, excellent improvement of charge/discharge cycle characteristics is not realized.

When micro-holes of the separator are produced in a smaller size, gas does not easily transmit through the separator. Under these conditions, oxygen gas generated from the positive electrode when the cell is fully charged does not reach to the negative electrode to be consumed thereat. Thus, the performance of the cell is deteriorated as the internal pressure thereof becomes higher due to the unconsumed oxygen gas.

The second method has a problem that oxygen gas is not absorbed efficiently when quaternary ammonium is added, which results in inefficient performance of the cell as the internal pressure becomes higher.

The third method has a problem that satisfactory effect is not obtained with a cell having a paste negative electrode when silicic acid salt is added. Moreover, charge/discharge cycle characteristics are deteriorated because silicic acid salt turns the active material into inactive plane crystals.

The fourth method has a problem that manufacturing cost becomes higher as it requires a galvanizer and electrical equipment as well as more complicated manufacturing process.

SUMMARY OF THE INVENTION

The present invention has a primary object for providing an enclosed alkaline storage cell having capabilities of solving problems unsolved with the above 4 methods as well as restraining migration in order to enhance charge/discharge cycle characteristics excellently.

These objects are fulfilled by an enclosed alkaline storage cell comprising a negative electrode made of materials including a main active material of cadmium oxide, a positive electrode, and a separator impregnated with an alkaline electrolytic solution and interposed therebetween, characterized in that the negative electrode has a product produced by cross linking reaction between high polymers having hydroxyl group and at least one of boric acid and boric acid salt inside and/or on the surface thereof.

These objects may be fulfilled by the enclosed alkaline storage cell described above, wherein high polymers having hydroxyl group are at least one of polyvinyl alcohol (hereinafter referred to as PVA) and ethylene-vinyl alcohol copolymer, or wherein the boric acid is selected from the group of acid consisting of orthoboric acid, metaboric acid, and tetraboric acid, or wherein boric acid salt is borax.

Also these objects may be fulfilled by the enclosed alkaline storage cell, wherein the cell is made by the process comprising steps of; producing a plate by spreading a paste made of materials including a main active material of cadmium oxide on the surface of an active material supporter; forming high polymers having hydroxyl group reactant to at least one of boric acid and boric acid salt in cross linking reaction on the surface of the plate; and having cross linking reaction between the high polymers and at least one of boric acid and boric acid salt, or wherein the cell is made by the process comprising steps of; producing a paste having cadmium oxide as a main active material, at least one of boric acid and boric acid salt, high polymers having hydroxyl group reactive to at least one of the boric acid and the boric acid salt in cross linking reaction; and producing a plate by spreading the paste on the surface of an active material supporter, or wherein the cell is made by the process comprising steps of; producing a plate by spreading a paste having cadmium oxide as a main active material, high polymers having hydroxyl group reactive to at least one of boric acid and boric acid salt in cross linking reaction on the surface of an active material supporter; and having cross linking reaction between the high polymers and at least one of boric acid and boric acid salt, or wherein the cell is made by the process comprising steps of; producing a plate by spreading a paste having cadmium oxide as a main active material on the surface of an active material supporter; and forming at least one of boric acid and boric acid salt, high polymers having hydroxyl group reactant to at least one of the boric acid and the boric acid salt in cross linking reaction on the surface of the plate.

The reason these objects are fulfilled are as follows. During the course of experiments by the inventors of the present invention, it was confirmed that the state of a negative electrode surface affected migration of cadmium considerably. More specifically, it was confirmed that when the surface of the negative electrode was coated with a film of high polymers, migration of cadmium from the negative electrode to the separator was effectively prevented. This is because the film on the surface of the negative electrode prevents intermediate substances of cadmium, which is solvable to the electrolytic solution, from diffusing to and precipitating on the separator when they are produced as a result of charge/discharge reaction. On the basis of the above effect, migration of cadmium can be restrained well enough by covering the surface of the negative electrode with conventional PVA or the like. However, the film formed of PVA or the like is oxidized by oxygen gas generated when the cell is charged, or damaged by heat generated as the result of the temperature rise when the cell is charged or discharged. Therefore, the effect of restraining migration does not last for a long period.

However, with the above structure, cross linking reaction happens between high polymers inside the negative electrode and/or on the surface thereof and either internal boric acid or boric acid salt. In addition, from experiments by the inventors of the present invention, it was confirmed that the product produced by cross linking reaction between high polymers and boric acid or the like retained strong resistance to dissolution. Therefore, with the above structure, the product produced inside of the negative electrode and/or on the surface thereof is not easily damaged when the cell is charged or discharged. Consequently, the effect of restraining migration can last for a long period and charge/discharge cycle of the cell can be remarkably prolonged.

High polymers having hydroxyl group which reacts with boric acid or boric acid salt in cross linking reaction are not limited to PVA. The same effect is obtained when ethylene-vinyl alcohol copolymer is utilized instead of PVA. However, binders such as methyl cellulose, carboxymethyl cellulose, hydroxypropyl cellulose are not utilized in the present invention, as they do not react with boric acid or the like in cross linking reaction.

BRIEF DESCRIPTION OF THE DRAWINGS

Those and other objects, advantages and features of the invention will become apparent from the following description thereof taken in conjunction with the accompanying drawings which illustrate specific embodiments of the invention. In the drawings.

DESCRIPTION OF THE PREFERRED EMBODIMENTS

FIRST EMBODIMENT

EXAMPLE

Figure 1:
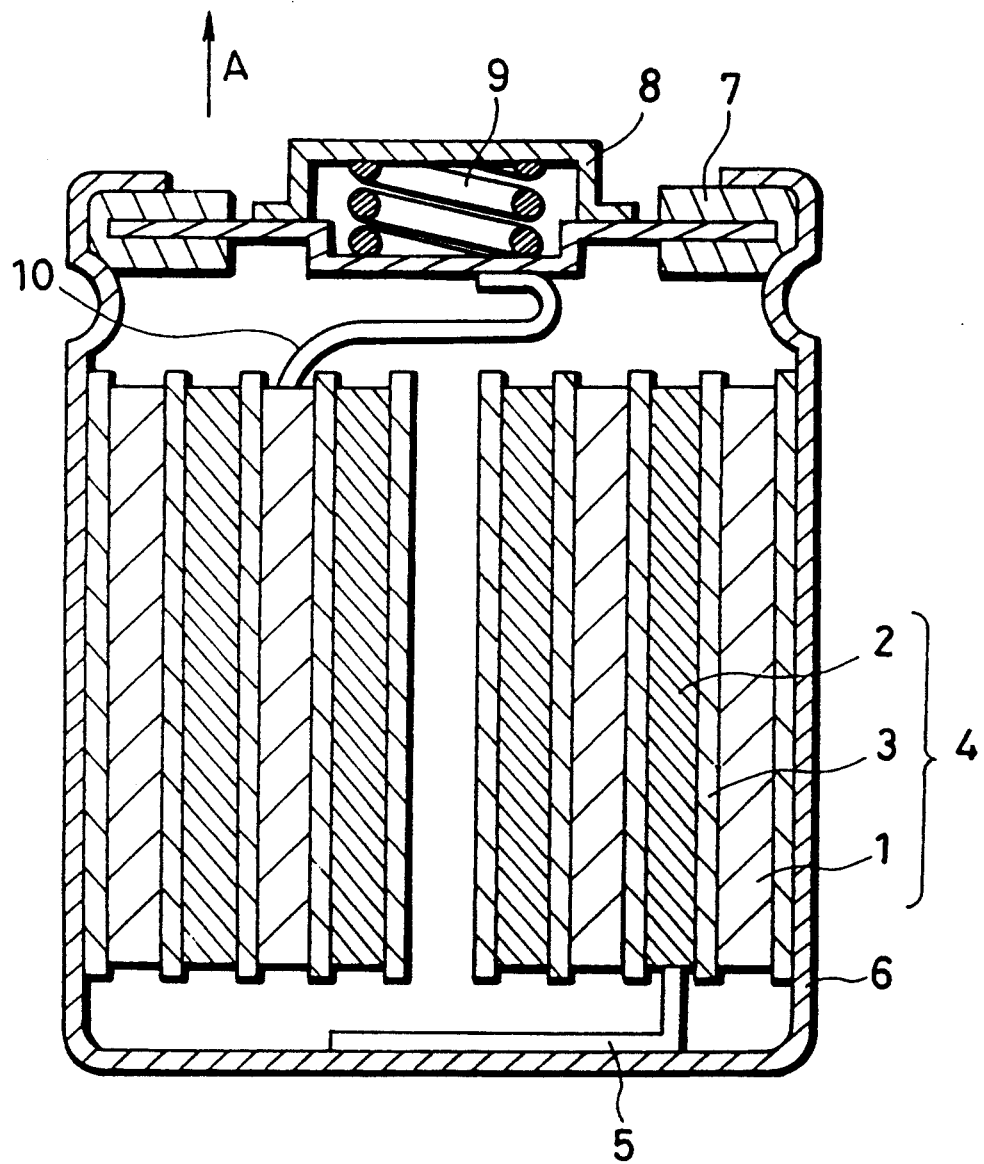
FIG. 1 is a cross section of the enclosed nickel-cadmium storage cell of the present invention.

FIG. 1 shows a cross section of the enclosed nickel-cadmium storage cell of the present invention which constitutes a volute coiled electrode group 4 comprising a nickel positive electrode 1, a negative electrode 2 made of materials including cadmium oxide as an active material, a separator 3 interposed therebetween. The electrode group 4 is disposed inside of an external container 6 which also serves as a negative electrode terminal. The external container 6 is connected to the negative electrode 2 by means of a conducting tab 5 for the negative electrode. A sealing member 8 is disposed by way of a packing 7 on the upper opening of the external container 6, and a coil spring 9 is disposed inside of the sealing member 8. The coil spring 9 is designed to be pressed in the direction of an arrow A when the internal pressure of the storage cell becomes abnormally high so that internal gas is to be released to the atmosphere. The sealing member 8 is connected to the positive electrode 1 by way of a conducting tab 10 for the positive electrode.

The enclosed nickel-cadmium storage cell was produced in a process comprising steps as follows.

First, 800 g of cadmium oxide as a main active material, 200 g of metal cadmium as a reserve charging active material, 10 g of hydroxypropyl cellulose as a binder, 10 g of nylon fiber as a reinforcing material, and 400 g of 5% $NaHPO_4.12H_2O$ (sodium phosphate) solution were kneaded in order to form a paste.

Then, the paste was dried after it was spread in the thickness of 0.3 mm on the both surfaces of a nickel-plated punched metal(thickness : 0.08 mm) utilized as an active material supporter. The punched metal with the paste on both surfaces thereof was cut according to a specification in order to produce a plate.

The plate was hydrated by being soaked in NaOH (sodium hydroxide) solution with the specific gravity of 1.23 and at the temperature of 30° C. for 2 hours in order to turn the cadmium oxide into cadmium hydroxide.

Further, in order to produce the cadmium negative electrode 2, layers of high polymers were formed on the surface of the plate by spreading 5% PVA solution as high polymers, wherein approximately 4 mg of the high polymers per 1 g of the active material should be included.

After these steps, the cadmium negative electrode 2 and the nickel positive electrode 1 were volute coiled by way of the separator 3 in order to produce the electrode group 4, which was disposed inside of the external container 6.

Finally, a cell with a nominal capacity of 1.5 AH was produced by sealing the upper opening of the cell after the cell was filled up with KOH (potassium hydroxide) solution with a specific gravity of 1.3 including 0.1 mol/l of orthoboric acid ($H_3BO_3$). A cell produced in this method is referred to as Cell (A).

Comparative Example 1

A cell was produced in the same method of Cell (A) except layers of high polymers were not formed on the surface of the plate. A cell produced in this method is referred to as Cell (W1).

Comparative Example 2

A cell was produced in the same method of Cell (A) except orthoboric acid was not included in the electrolytic solution so that the electrolytic solution was formed of only potassium hydroxide therein. A cell produced in this method is referred to as Cell (W2).

Comparative Example 3

A cell was produced in the same method of Cell (A) except layers of high polymers were not formed on the surface of the plate and orthoboric acid was not included in the electrolytic solution. A cell produced in this method is referred to as Cell (W3).

Experiment 1

Figure 2:
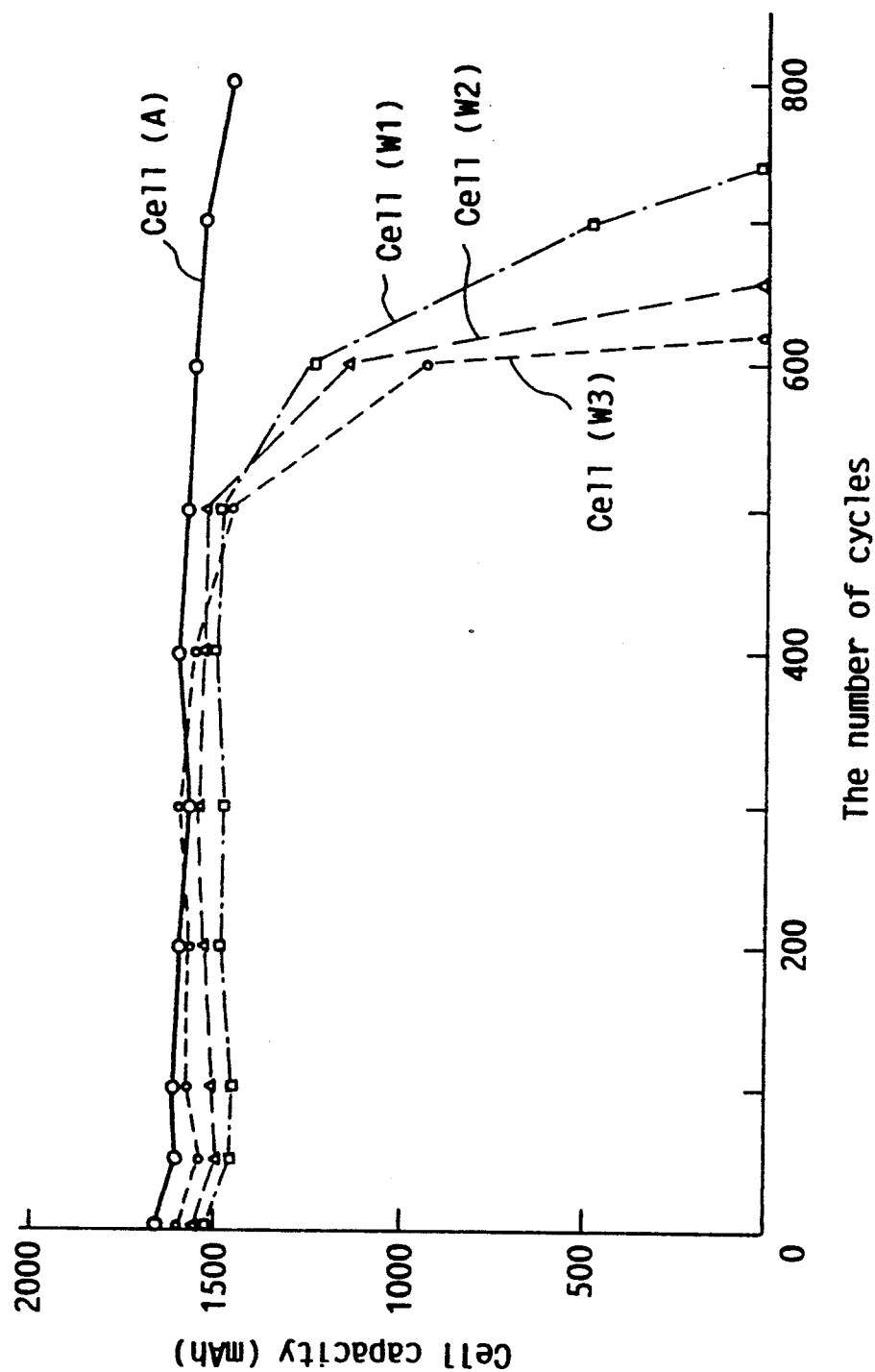
FIG. 2 is a graph showing charge/discharge cycle characteristics of Cell (A) of the present invention and Cell (W1) to Cell (W3) of Comparative Examples.

Charge/discharge cycle characteristics of Cell (A) of the present invention and Cell (W1) to Cell (W3) were examined, and the results are shown in FIG. 2. They were charged in a current of 150 mA (0.1 C) for 16 hours and discharged in a current of 1.5 A(1 C) to the discharge ending voltage of 0.8 V. It is apparent from FIG. 2 that charge/discharge cycle characteristics were tremendously improved in Cell (A) of the present invention compared with that of Cell (W1) to Cell (W3) of the Comparative Examples.

Experiment 2

Figure 3:
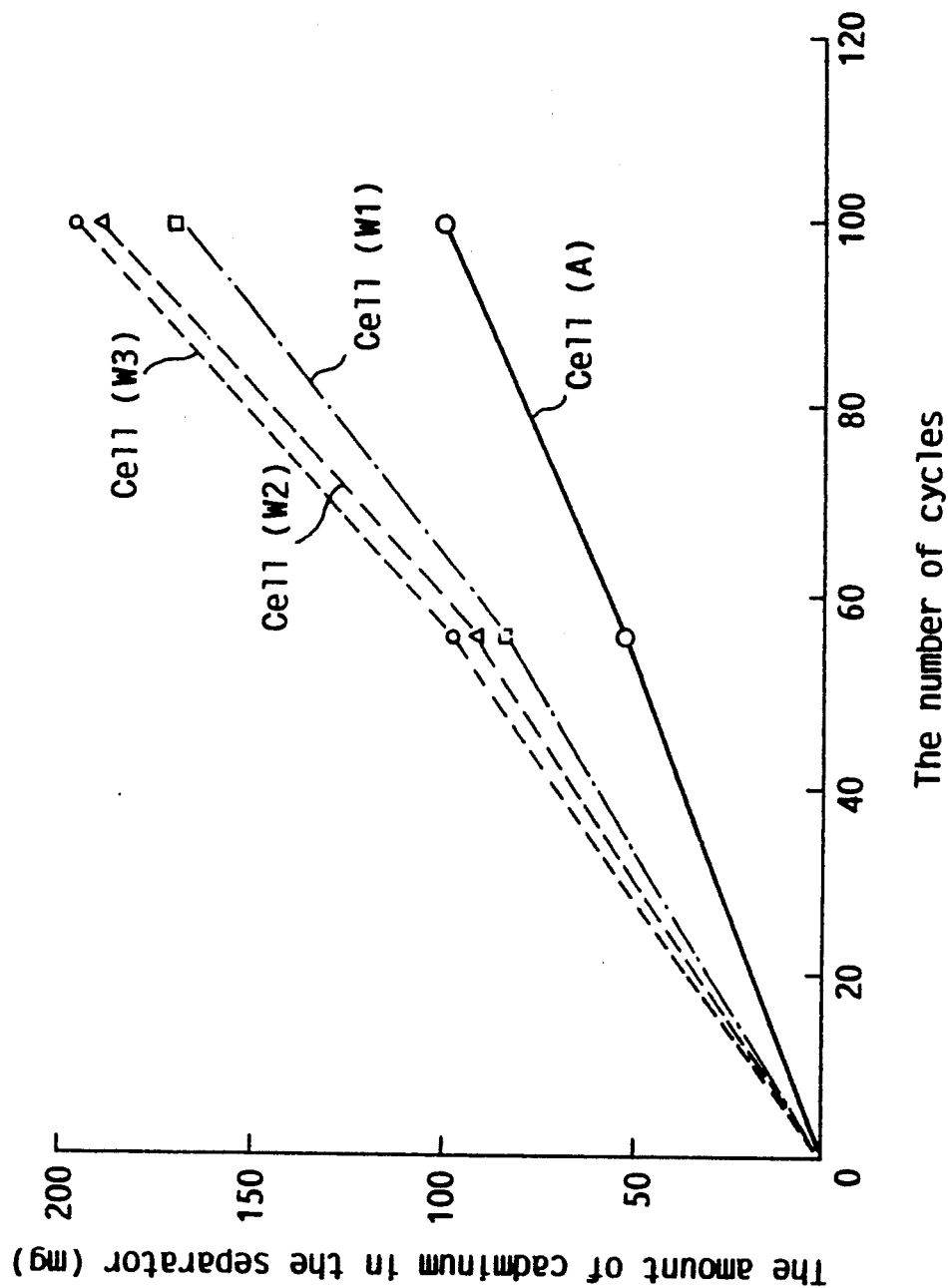
FIG. 3 is a graph showing a relation between the number of charge/discharge cycles and the amount of cadmium in the separators of Cell (A) of the present invention and Cell (X1) to Cell (X3) of Comparative Examples.

The amount of cadmium in the separators of Cell (A) of the present invention and Cell (W1) to Cell (W3) of the Comparative Examples after 50 and 100 cycles was measured, and the results are shown in FIG. 3. In order to measure the amount of cadmium in every 50 cycles up to 100 cycles, the separator of each cell was removed therefrom, soaked in HCl (hydrochloric acid) and heated so that cadmium dissolved thereinto. Finally, the amount of metal cadmium was measured by atomic absorption analysis.

It is apparent from FIG. 3 that the amount of cadmium in the separator of Cell (A) of the present invention decreased tremendously compared with that of Cell (W1) to Cell (W3) of the Comparative Examples. In addition, stains caused by reprecipitation of cadmium were observed visually on the separators of Cell (W1) to Cell (W3) of the Comparative Examples while it was not observed on the separator of Cell (A) of the present invention.

According to these results, it was confirmed that charge/discharge cycle characteristics of Cell (W1) to Cell (W3) of the Comparative Examples were deteriorated while that of Cell (A) of the present invention was improved. This is assumed to be because migration happened in Cell (W1) to Cell (W3) of the Comparative Examples whereas it was restrained in Cell (A) of the present invention. More specifically, a short circuit happened as cadmium migrated from the negative electrode to the positive electrode through penetrating the separators interposed therebetween in Cell (W1) to (W3) of the Comparative Examples, while a short circuit was prevented by restraining cadmium to migrate from the negative electrode to the positive electrode through penetrating the separator interposed therebetween in Cell (A) of the present invention.

Remarks

Although the amount of boric acid(orthoboric acid) to be added to the electrolytic solution was 0.1 mol/1 in the above Embodiment, the same effect is obtained when it ranges from 0.01 to 0.5 mol/l. Moreover, it was confirmed from the experiments that the same effect was obtained when metaboric acid ($HBO_2$), tetraboric acid ($H_2B_4O_7$), oxides such as boron trioxide($B_2O_3$), boric acid salt such as borax ($Na_2B_4O_7.10H_2O$) were utilized instead of orthoboric acid.

During the process of producing the negative electrode utilized in Cell (A) of the present invention, not only charge/discharge cycle characteristics but also absorption characteristics of oxygen gas were improved when conducting powders such as acetylene black or nickel were added into the layers of PVA.

The layers of PVA were formed on the surface of the negative electrode in the above Example, however, the same effect was obtained when layers of PVA were formed on the contacting surface of the separator instead of the surface of the negative electrode.

Second Embodiment

Example

A cadmium negative electrode was produced in the following steps.

First, 90 weight parts of cadmium oxide as a main active material, 10 weight parts of metal cadmium as a reserve charging active material, 0.5 weight parts of acrylic short fiber as a reinforcing material, 0.8 weight parts of PVA, 40 weight parts of 5% $NaHPO_4.12H_2O$ (sodium phosphate) solution, and 0.2 weight parts of boric acid(orthoboric acid) were kneaded in order to form a paste.

Then, the paste was dried after it was spread in the thickness of 0.3 mm on the both surfaces of a nickel-plated punched metal(thickness : 0.08 mm) utilized as an active material supporter. The punched metal with the paste on both surfaces thereof was cut to a specification in order to produce a cadmium negative electrode.

Further, in order to produce a cell, the cadmium negative electrode and the nickel positive electrode were volute coiled by means of the separator in order to produce the electrode group, which was disposed inside of the external container.

Finally, a cell with a nominal capacity of 1.5 AH was produced by sealing the upper opening of the cell after the cell was filled with an alkaline electrolytic solution (KOH (potassium hydroxide) solution with a specific gravity of 1.3). A cell produced in this method is referred to as Cell (B).

The major differences in the producing methods between Cell (B) and Cell (A) of the Example of the First Embodiment are shown in Table 1.

TABLE 1

| Cell | A method to add PVA | A method to add boric acid |
| --- | --- | --- |
| A | Spread on the surface of the negative electrode | Mixed in the electrolytic solution |
| B | Mixed in the active material | Mixed in the active material |

Comparative Example

A cell was produced in the same method of Cell (B) except boric acid was not added into the paste. A cell produced by this method is referred to as Cell (X).

Experiment

Figure 4:
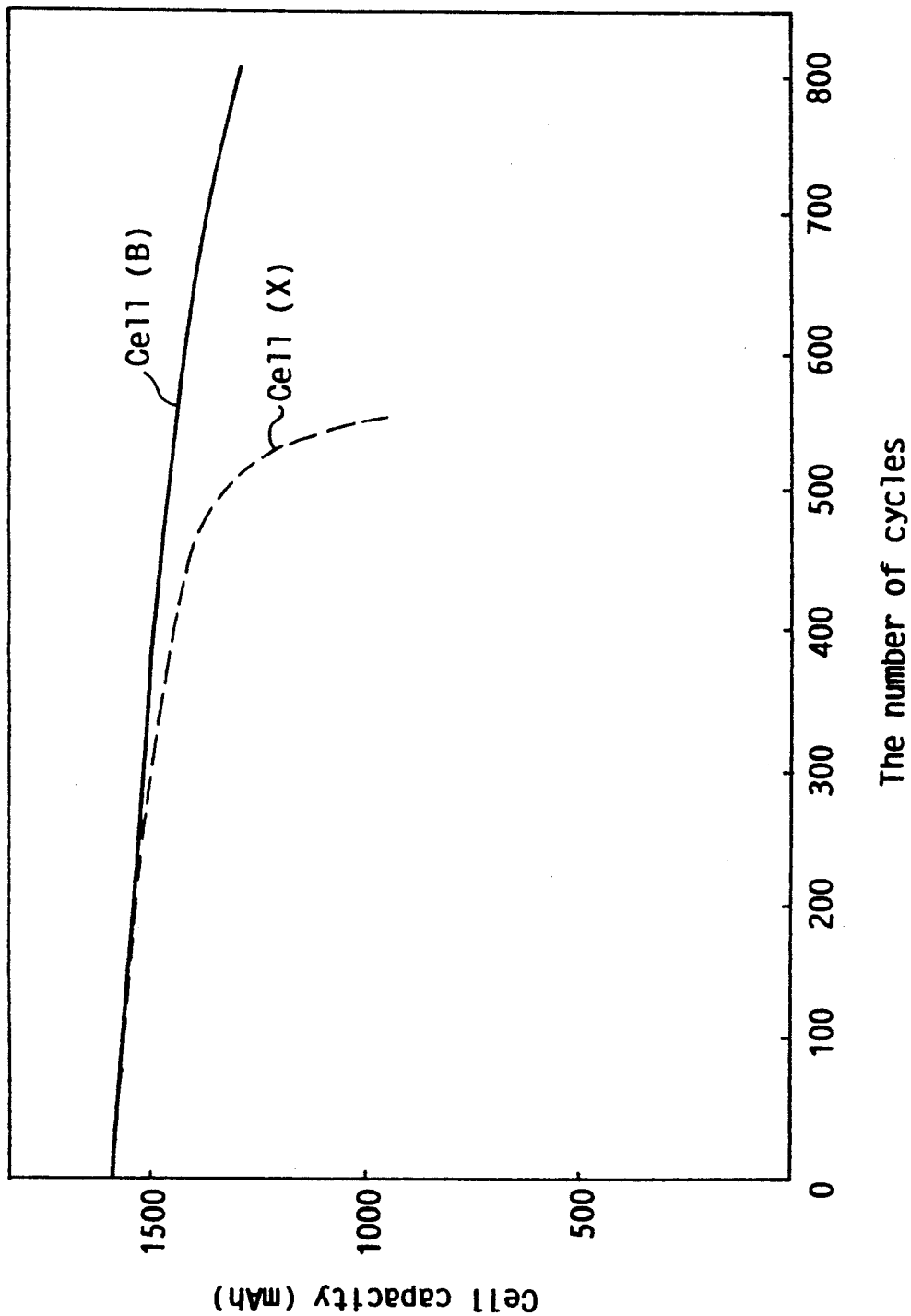
FIG. 4 is a graph showing charge/discharge cycle characteristics of Cell (B) of the present invention and Cell (X) of a Comparative Example.

Charge/discharge cycle characteristics of Cell (B) of the present invention and Cell (X) of the Comparative Example were examined, and the results are shown in FIG. 4. They were charged in a current of 1.5 A(1 C) for 90 minutes and discharged in a current of 1.5 A(1 C) to the discharge ending voltage of 1.0 V.

It is apparent from FIG. 4 that charge/discharge cycle characteristics of Cell (B) of the present invention were tremendously improved compared with that of Cell (X) of the Comparative Example.

Experiment 2

The amount of cadmium in the separators of Cell (B) of the present invention and Cell (X) of the Comparative Example after 100 cycles was measured, the results are shown in Table 2. In order to measure the amount of cadmium after 100 cycles, the separator of each cell was removed therefrom, soaked in HCl (hydrochloric acid) and heated so that cadmium dissolved thereinto. Finally, the amount of metal cadmium was measured by atomic absorption analysis.

TABLE 2

| Cell | The amount of cadmium in the separator (mg) |
| --- | --- |
| B | 72 |
| X | 226 |

It is apparent from Table 2 that the amount of cadmium in the separator of Cell (B) of the present invention tremendously decreased compared with that of Cell (X) of the present invention.

Therefore, it is assumed that charge/discharge cycle characteristics were improved as confirmed in the Experiment 1 of the Second Embodiment because migration of cadmium was restrained in Cell (B) of the present invention.

Remarks

In the above Embodiment, 0.2 weight parts of boric acid was added to the materials of the paste, however, the same effect of the Second Embodiment can be obtained when the amount of boric acid ranges from 0.01 to 1 weight parts. In addition, it was confirmed from experiments that the same effect was obtained when oxides such as metaboric acid, tetraboric acid, boron trioxide, or boric acid salt such as borax were utilized instead of boric acid.

Third Embodiment

Example 1

A cell with a nominal capacity of 1.5 AH was produced in the same method of the Example of the Second Embodiment except that a cadmium negative electrode was produced in the following steps. The cell produced in this method is referred to as Cell (C1).

First, a paste was produced in the same method of the Example of the Second Embodiment except that boric acid was not included in the materials of the paste. The paste was dried after it was spread in the thickness of 0.3 mm on the both surfaces of a nickel-plated punched metal (thickness : 0.08 mm) utilized as an active material supporter in order to produce a plate.

The plate was hydrated by being soaked in NaOH (sodium hydroxide) solution with a specific gravity of 1.23 at the temperature of 30° C. for 1 hour and washed in order to remove alkali.

Further, the plate was soaked in boric acid solution of 0.5 mol/l for 1 minute, then dried completely in the air at the temperature of 80° C.

Finally, the plate was cut to a specification in order to produce a cadmium negative electrode, wherein approximately 1.4 mg of high polymers per 1 g of the active material should be included.

Example 2

A cell was produced in the same method of the Example of the Third Embodiment except that formation was applied instead of hydration, wherein the plate was charged in a current of 0.1 C of rated capacity for the plate in KOH (potassium hydroxide) solution for 15 hours, and discharged completely in a current of 0.2 C.

Approximately 1.4 mg of high polymers per 1 g of the active material should be included in a cadmium negative electrode. A cell produced in this method is referred to as Cell (C2).

Major differences in the producing method among Cell (C1), (C2) and Cell (A) of the Example of the First Embodiment are shown in Table 3.

TABLE 3

| Cell | A method to add PVA | A method to add boric acid |
|---|---|---|
| A | Spread on the surface of the negative electrode | Mixed with the electrolytic solution |
| C1 C2 | Mixed with the active material | The plate was soaked in boric acid solution |

Comparative Example 1 and 2

Cells were produced in the same method of the Example 1 and the Example 2 of the Third Embodiment respectively except that the plates were not soaked in boric acid solution. Cells produced in these methods are referred to as Cell (Y1) and Cell (Y2) respectively.

Experiment 1

Figure 5:
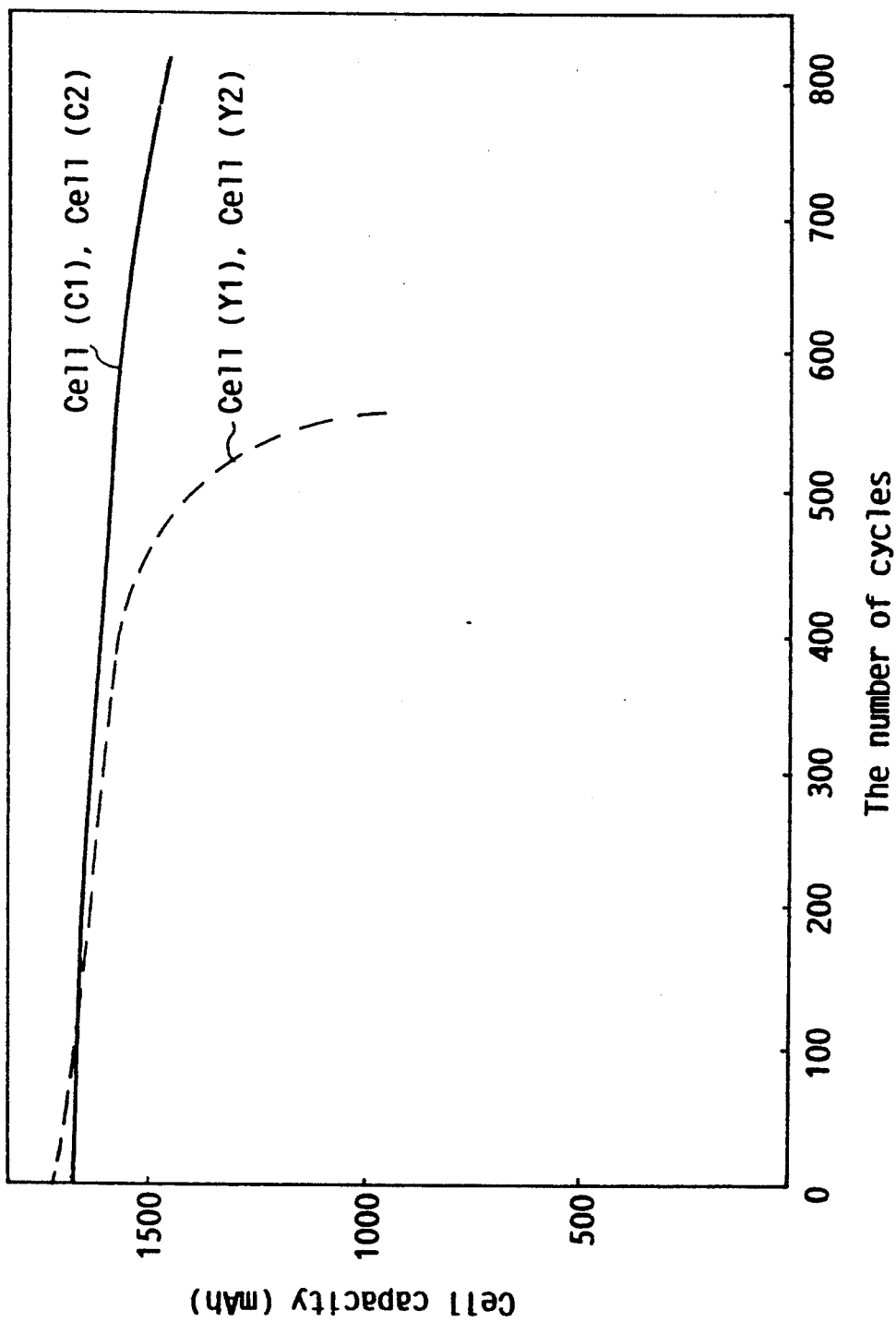
FIG. 5 is a graph showing charge/discharge cycle characteristics of Cell (C1), Cell (C2) of the present invention and Cell (Y1), Cell (Y2) of Comparative Examples.

Charge/discharge cycle characteristics of Cell (C1), Cell (C2) of the present invention and Cell (Y1), Cell (Y2) of the Comparative Examples were examined, the results are shown in FIG. 5. They were charged in a current of 1.5 A (1C) until the charge voltage reached a peak voltage and then dropped 10 mV below the peak voltage, and discharged in a current of 1.5 A (1C) to the discharge ending voltage of 1.0 V.

It is apparent from FIG. 5 that charge/discharge cycle characteristics of Cell (C1), Cell (C2) of the present invention were improved tremendously compared with that of Cell (Y1), Cell (Y2) of the Comparative Examples.

Experiment 2

The amount of cadmium in the separators of Cell (C1), (C2) of the present invention, and Cell (Y1), Cell (Y2) of the Comparative Examples after 100 cycles was measured, and the results are shown in Table 4. In order to measure the amount of cadmium after 100 cycles, the separator of each cell was removed therefrom, soaked in HCl (hydrochloric acid) and heated so that cadmium dissolved thereinto. Finally, the amount of metal cadmium was measured by atomic absorption analysis.

TABLE 4

| Cell | The amount of cadmium in the separator (mg) |
|---|---|
| C1 | 82 |
| C2 | 73 |
| Y1 | 216 |
| Y2 | 198 |

It is apparent from Table 4 that the amount of cadmium in the separators of Cell (C1), Cell (C2) of the present invention tremendously decreased compared with those of Cell (Y1), Cell (Y2) of the Comparative Examples.

It is assumed that charge/discharge cycle characteristics were improved as confirmed in the Experiment 1 of the Third Embodiment because migration of cadmium was restrained in Cell (C1), Cell (C2) of the present invention.

Remarks

It is effective enough to add 0.2 mg of boric acid per 1 g of the active material. The more boric acid is added, the less concentrated the electrolytic solution becomes. Therefore the most preferable adding amount of boric acid is approximately 10 mg per 1 g of the active material.

Fourth Embodiment

Example 1

A cell with a nominal capacity of 1.0 AH was produced in the same method of the Example of the Second Embodiment except that a cadmium negative electrode was produced in the following steps. A cell produced in this method is referred to Cell (D1).

First, 80 weight parts of cadmium oxide as a main active material, 20 weight parts of metal cadmium as a reserve charging active material, 1 weight parts of hydroxypropyl cellulose as a binder, 1 weight parts of nylon short fiber as a reinforcing material, 40 weight parts of 5% $NaHPO_4.12H_2O$ (sodium phosphate) solution were kneaded in order to form a paste.

Then the paste was dried after it was spread in the thickness of 0.3 mm on the both surfaces of a nickel-plated punched metal(thickness : 0.08 mm) utilized as an active material supporter in order to form a plate.

Further, the plate was dried after layers of high polymers were formed on the surface of the plate by spreading 10% PVA solution.

Then, the plate was hydrated by being soaked for 1 hour in NaOH (sodium hydroxide) solution with a specific gravity of 1.28. Finally, the plate was soaked for 30 minutes in NaOH (sodium hydroxide) solution with a specific gravity of 1.28 in which 0.5 mol/l of boric acid was dissolved and, further, washed and dried in order to produce a cadmium negative electrode.

Example 2

A cell was produced in the same method of the Example 1 of the Fourth Embodiment except that a cadmium negative electrode was produced in the following steps. A cell produced in this method is referred to as Cell (D2).

A plate was produced by the same method of Example 1 of the Fourth Embodiment. However, the surface of the plate was coated with a film forming solution, which was produced by mixing 100 weight parts of 10% PVA solution and 100 weight parts of 3% boric acid solution. The mixed solution was heated and maintained at 60° C. in order to be spread evenly on the surface of the plate, as it easily becomes viscous or turns into gel in normal condition. The plate coated with the mixed solution was dried in order to produce a cadmium negative electrode.

Major differences in the producing methods among Cell (D1), Cell (D2) and Cell (A) of the Example of the First Embodiment are shown in Table 5.

TABLE 5

| Cell | A method to add PVA | A method to add boric acid |
|---|---|---|
| A | Spread on the surface of the negative electrode | Mixed with the electrolytic solution |
| D1 | Spread on the surface of the negative electrode | Plate was soaked in boric acid solution |
| D2 | Spread on the surface | Spread on the surface |

TABLE 5-continued

| Cell | A method to add PVA | A method to add boric acid |
|---|---|---|
| | of the negative electrode | of the negative electrode |

Comparative Example 1

A cell was produced in the same method of the Example 2 of the Fourth Embodiment except that boric acid was not added to the film forming solution. A cell produced in this method is referred to as Cell (Z1).

Comparative Example 2

A cell was produced in the same method of the Example 2 of the Fourth Embodiment except that the plate was not coated with any material. A cell produced in this method is referred to as cell (Z2).

Experiment

Figure 6:
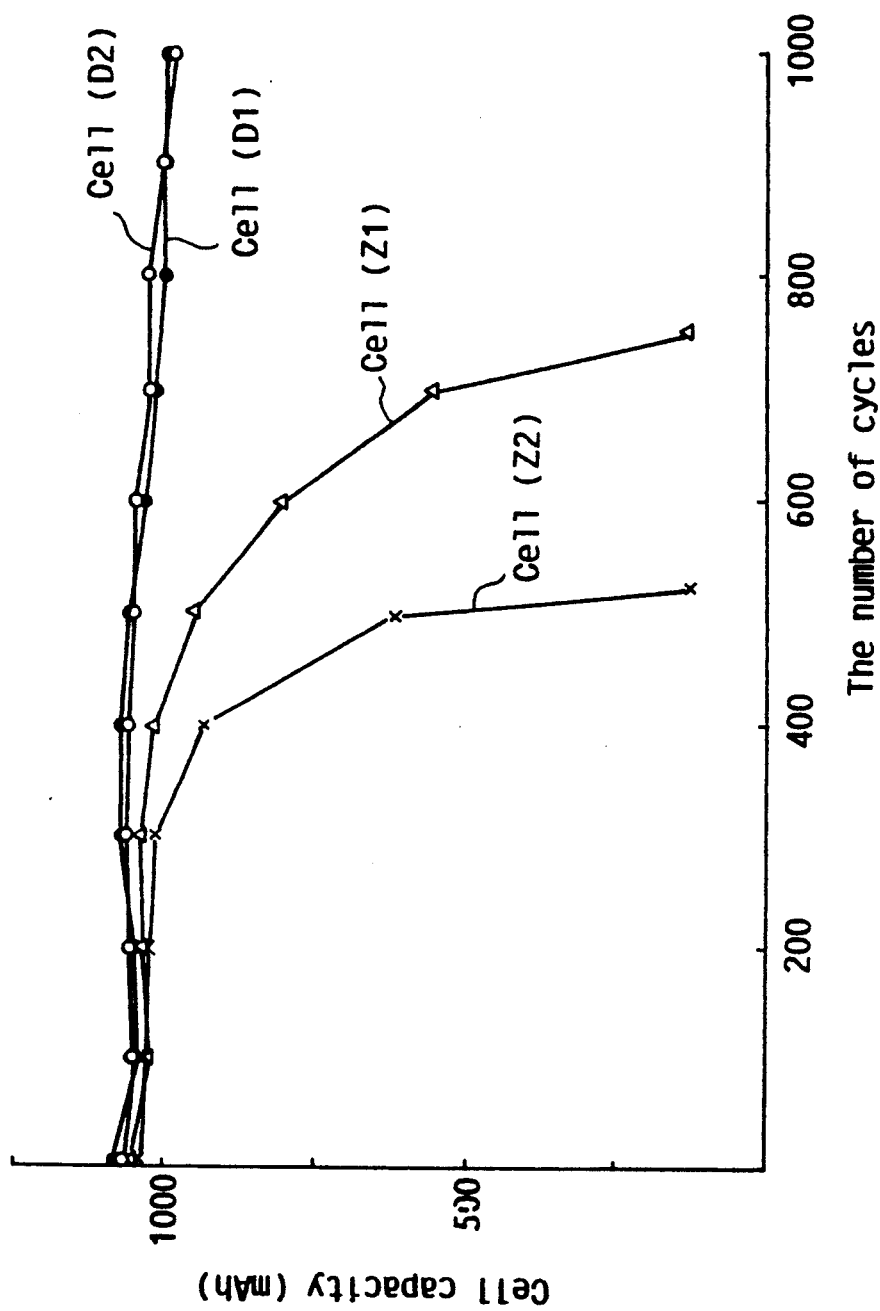
FIG. 6 is a graph showing charge/discharge cycle characteristics of Cell (D1), Cell (D2) of the present invention and Cell (Z1), Cell (Z2) of Comparative Examples.

Charge/discharge cycle characteristics of Cell (D1), cell (D2) of the present invention and Cell (Z1), Cell (Z2) of the Comparative Example were examined, the results are shown in FIG. 6. They were charged in a current of 1.0 A (1C) until the charge voltage reached a peak voltage and dropped 10 mV below the peak voltage, and discharged in a current of 1.0 A (1C) to the discharge ending voltage of 1.0 V.

It is apparent from FIG. 6 that charge/discharge cycle characteristics of Cell (D1), Cell (D2) of the present invention were tremendously improved compared with that of Cell (Z1), Cell (Z2) of the Comparative Examples.

When Cell (Z1), Cell (Z2) of the Comparative Example were disassembled at their life end, internal short circuits caused by the proceeding of migration were observed in both cells.

Experiment 2

Figure 7:
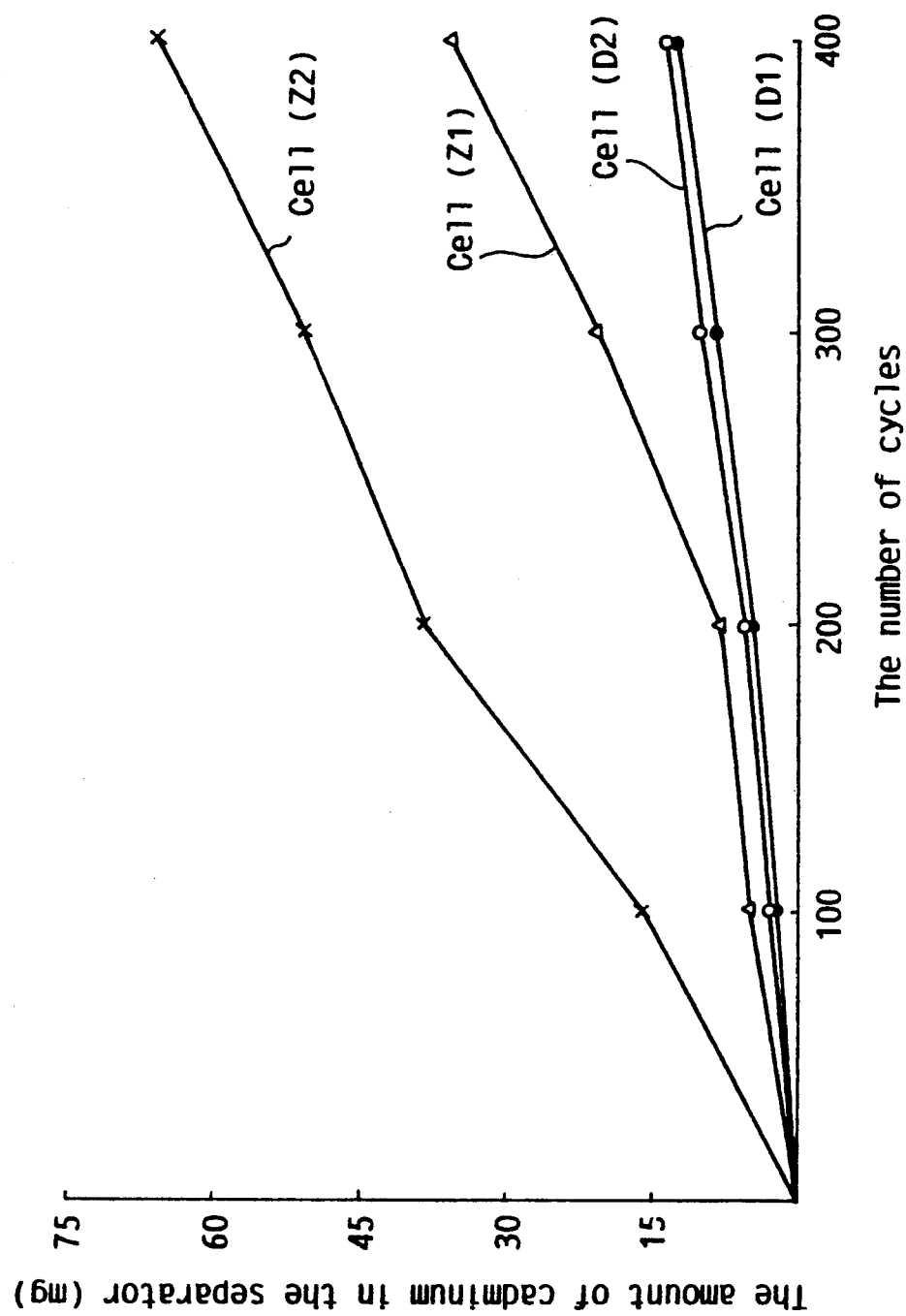
FIG. 7 is a graph showing a relation between the number of charge/discharge cycles and the amount of cadmium in the separators of Cell (D1), Cell (D2) of the present invention and Cell (Z1), Cell (Z2) of Comparative Examples.

The amount of cadmium in the separators of Cell (D1), Cell (D2) of the present invention and Cell (Z1), Cell (Z2) of the Comparative Examples was measured, the results are shown in FIG. 7. In order to measure the amount of cadmium after 100 cycles, the separator of each cell was removed therefrom, soaked in HCl (hydrochloric acid) and heated so that cadmium dissolved thereinto. Finally, the amount of metal cadmium was measured by atomic absorption analysis.

It is apparent from FIG. 7 that the amount of cadmium in the separators of Cell (D1), Cell (D2) of the present invention tremendously decreased compared with that of Cell (Z1), Cell (Z2) of the Comparative Examples.

It is assumed that charge/discharge cycle characteristics were improved as confirmed in the Example 1 of the Fourth Embodiment because migration of cadmium was restrained in Cell (D1), Cell (D2) of the present invention.

In Cell (Z2) of the Comparative Example having no PVA film on the surface of the plate, the amount of cadmium in the separator was on the increase from the beginning, while in Cell (Z1) of the Comparative Example, the increase of the amount of cadmium was restrained up to 200 cycles. This is because the plate was coated with PVA film in Cell (Z1). However, even with the PVA film, the amount of cadmium increased after 200 cycles in Cell (Z1). Therefore it is assumed that the PVA film was damaged after 200 cycles.

Remarks

In the Example 1, the negative electrode was soaked in boric acid solution or the like after it was hydrated, however, the same effect of the Example 1 is obtained when it was soaked in boric acid solution before it was hydrated. It is same in the case when formation is applied instead of hydration.

In the Example 1, deterioration of conducting performance of the electrolytic solution caused by mixing boric acid therewith was prevented because the plate was washed after it was soaked in NaOH (sodium hydroxide) solution in order to remove the excess boric acid which did not form cross-link with the high polymers included in the plate in cross linking reaction when soaked in NaOH (sodium hydroxide) solution.

In the Example 2, when boric acid was added to the film forming solution more than necessary, the PVA turned into gel and it became difficult to spread the film forming solution evenly on the surface of the plate. Moreover, conductivity of the electrolytic solution was deteriorated as the excess boric acid dissolved into the electrolytic solution. On the other hand, when boric acid was added to the film forming solution insufficiently, the film became fragile, as a result, it was not able to restrain migration effectively. Therefore, in order to prevent these bad effects, appropriate amount of boric acid should be added in any case.

In the Example 2, the film forming solution became viscous or turned into gel in accordance with degrees of polymerization of PVA, saponification, concentration of the solution, therefore, appropriate adding amount of each material should be determined in respect to work efficiency.

In the Examples 1 and 2, the same result was obtained when the negative electrodes were hydrated when the cells were produced.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed:

1. An enclosed alkaline storage cell comprising a negative electrode made of materials including a main active material of cadmium oxide, a positive electrode, and a separator impregnated with an alkaline electrolytic solution and interposed therebetween, characterized in that the negative electrode is coated with a layer made of a product produced by cross linking reaction between at least one of high polymers selected from the group consisting of polyvinyl alcohol and ethylene-vinyl alcohol copolymer, and at least one of boric acid and boric acid salt.

2. An enclosed alkaline storage cell of claim 1, wherein the boric acid is selected from the group of acid consisting of orthoboric acid, metaboric acid, and tetraboric acid.

3. An enclosed alkaline storage cell of claim 1, wherein boric acid salt is borax.

4. An enclosed alkaline storage cell of claim 1, wherein the cell is made by the process comprising steps of;
   producing a plate by spreading a paste made of materials including a main active material of cadmium oxide on the surface of an active material supporter;

forming at least one of high polymers selected from the group consisting of polyvinyl alcohol and ethylene-vinyl alcohol copolymer, which is reacted with at least one of boric acid and boric acid salt in cross linking reaction on the surface of the plate; and having cross linking reaction between the high polymers and at least one of boric acid and boric acid salt.

5. An enclosed alkaline storage cell of claim 1, wherein the cell is made by the process comprising steps of;

producing a plate by spreading a paste having cadmium oxide as a main active material on the surface of an active material supporter; and forming the layer of the product so as to coat the surface of the plate by cross linking reaction between at least one of boric acid and boric acid salt, and at least one of high polymers selected from the group consisting of polyvinyl alcohol and ethylene-vinyl alcohol copolymer.

* * * * *